T. MIDGLEY.
VEHICLE WHEEL.
APPLICATION FILED OCT. 22, 1908.
915,304.
Patented Mar. 16, 1909.
3 SHEETS—SHEET 2.
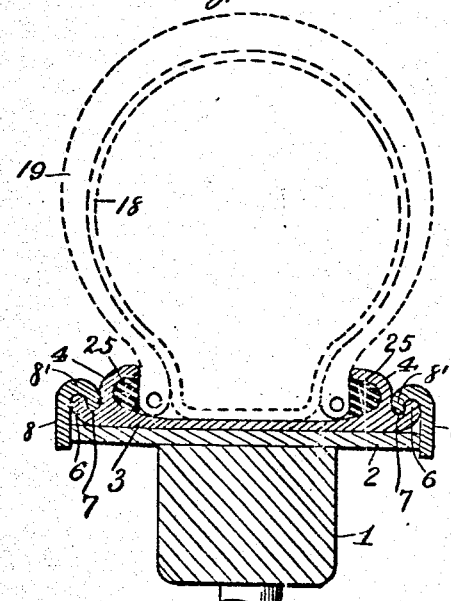
Fig. 3.
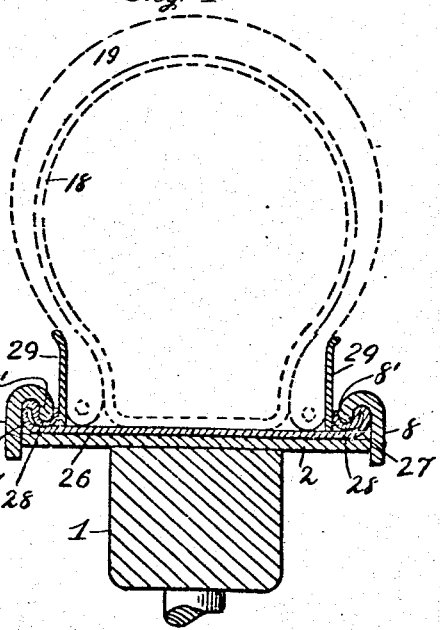
Fig. 4.
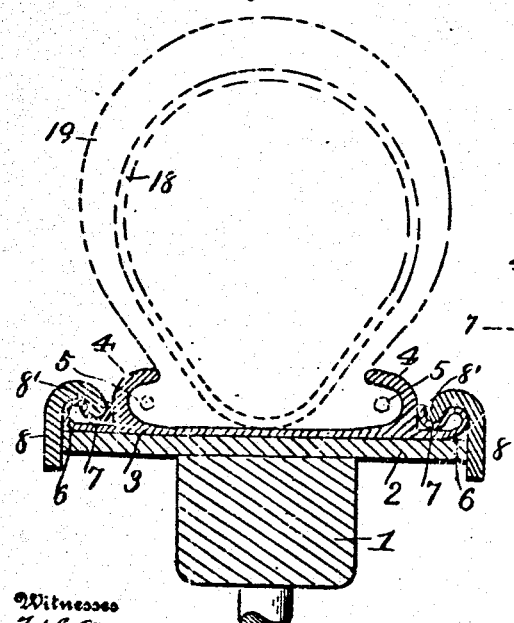
Fig. 5.
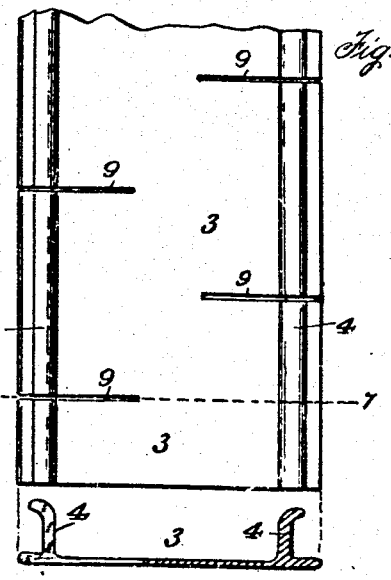
Fig. 6.
Fig. 7.
Witnesses
F. L. Ourand.
N. Parker Rinell.
Inventor
Thomas Midgley.
By D. C. Rinell.
Attorney T. MIDGLEY.
VEHICLE WHEEL.
APPLICATION FILED OCT. 22, 1906.
915,304.
Patented Mar. 16, 1909.
3 SHEETS—SHEET 3.
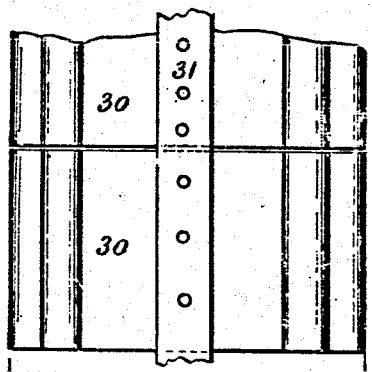
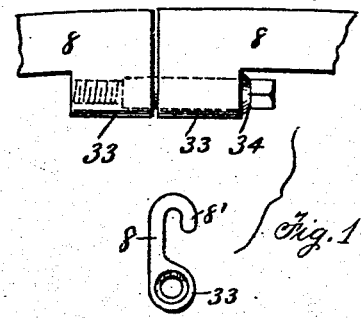
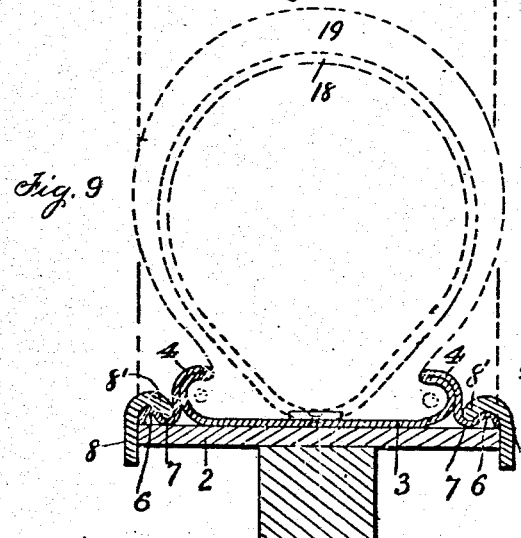
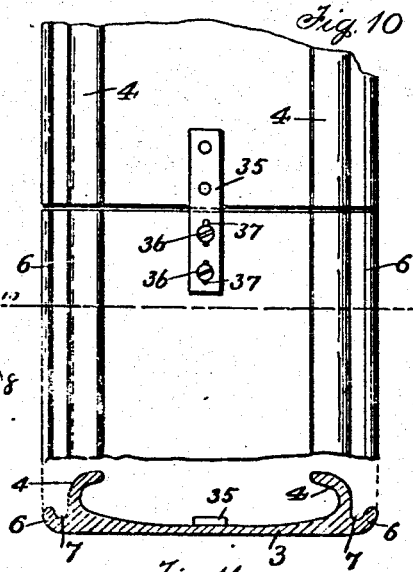
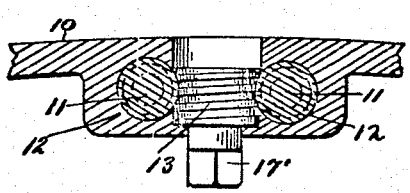
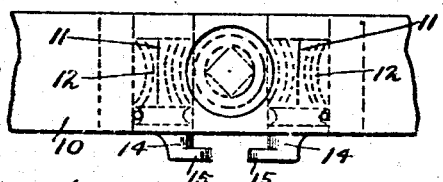
Witnesses
F. L. Garand.
N. Parker Russell.
Inventor
Thomas Midgley.
By D. C. Reinohl
Attorney

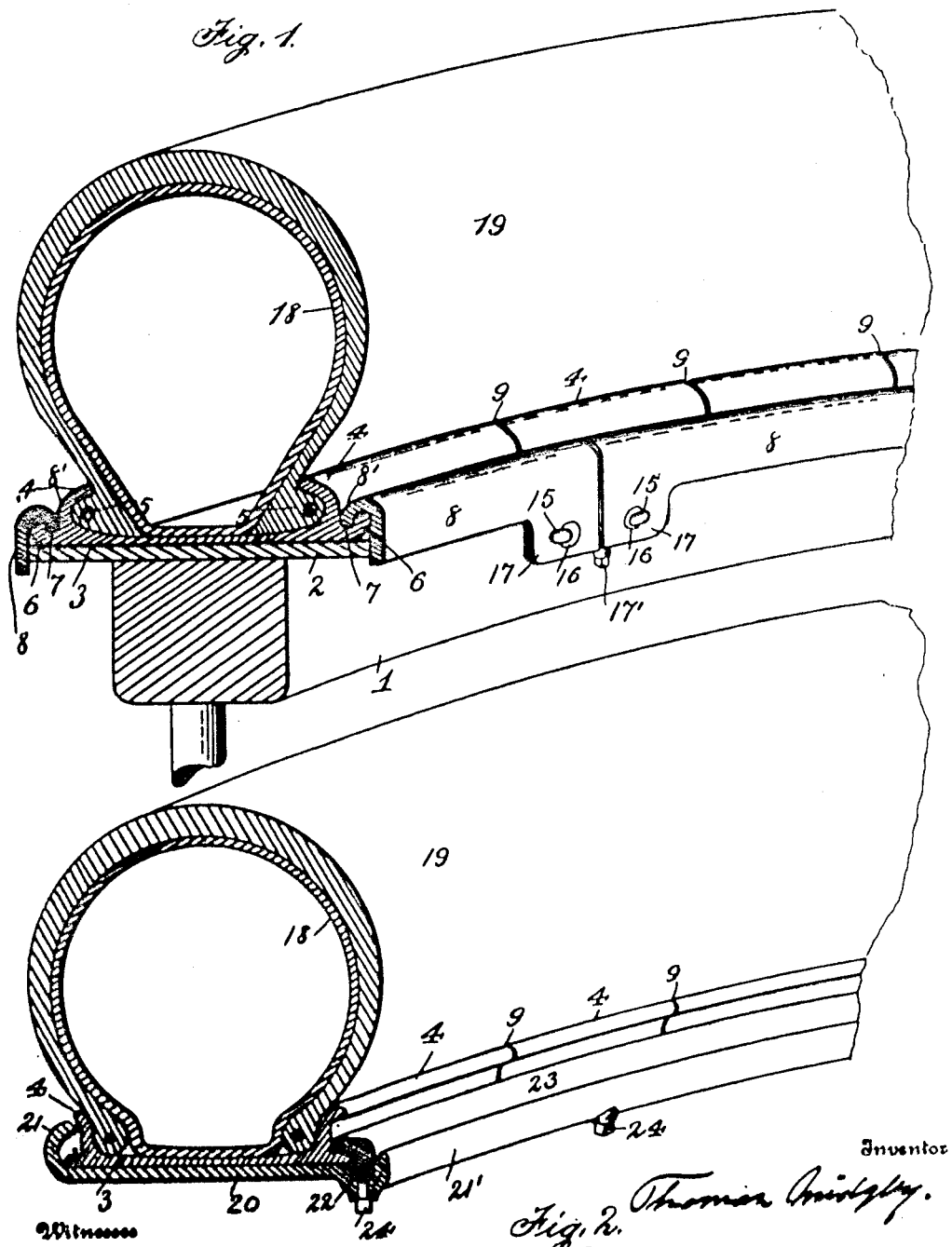

UNITED STATES PATENT OFFICE.

THOMAS MIDGLEY, OF COLUMBUS, OHIO.

VEHICLE-WHEEL.

No. 915,304.　　　　　Specification of Letters Patent.　　　Patented March 16, 1909.

Application filed October 22, 1908. Serial No. 458,965.

*To all whom it may concern:*

Be it known that I, THOMAS MIDGLEY, a citizen of the United States, residing at Columbus, in the county of Franklin and State of Ohio, have invented certain new and useful Improvements in Vehicle - Wheels; and I do hereby declare the following to be a full, clear, and exact description of the invention, such as will enable others skilled in the art to which it appertains to make and use the same.

My invention relates primarily to vehicle wheels, has especial reference to demountable supplemental rims for carrying and supporting inflated tires so that the same may be readily and easily placed upon the permanent rim of the wheel and speedily secured thereon, thereby avoiding the laborious work of pumping the tire, as in case of a punctured tire, blow out or other cause.

The invention will be fully disclosed in the following specification and claims.

In the accompanying drawings, which form part of this specification:—Figure 1 represents a perspective of a section of a vehicle wheel provided with a demountable supplemental rim provided with a clencher tire. Fig. 2 a like view of a modified form of the permanent and the supplemental rims and a Dunlop tire. Fig. 3 a vertical transverse section of another modification, on a reduced scale. Fig. 4 a like view of another modification. Fig. 5 a like view of another modification. Fig. 6 a plan view of the supplemental rim. Fig. 7 a vertical transverse section of the same on line 7—7, Fig. 6. Fig. 8 a plan view of another modification of the supplemental rim. Fig. 9 a vertical transverse section of the same. Fig. 10 a plan view of the supplemental rim, showing the adjacent ends thereof connected. Fig. 11 a vertical transverse section of the same on line 10—10—Fig. 11. Fig. 12 a vertical longitudinal section, partly in side elevation of a device for contracting the clamping rings, and the supplemental rim. Fig. 13 a plan view of the same. Fig. 14 a side elevation and an end view of the adjacent ends of one of the clamping rings, showing a modification of the means for contracting the clamping ring.

Reference being had to the drawings and the designating characters thereon, the numeral 1 indicates the felly, and 2 the permanent cylindrical rim of a vehicle wheel, as shown in Figs. 1, 3, 4, 5, and 9.

Referring to Fig. 1, 3 indicates an annular demountable supplemental rim formed of hot rolled metal, such as steel, reduced in thickness toward its transverse center and provided with upward and inward bent members 4, 4, to engage the projections 5, 5, of a clencher tire, and with upturned members 6, and a seat or groove 7 to receive a clamping ring 8 which secures the demountable supplemental rim on the permanent rim 2. The rim 3 is cut transversely from opposite sides as shown at 9, in Figs. 1, 2 and 6 to permit it to expand and contract at the edges thereof easily and conform to the permanent rim, and the reduced portion of the rim 3 between its members allows the tires of usual diameters to be used on the rim. The clamping rings 8 extend inward toward the felly of the wheel and engage the edges of the rim 2 and prevent any lateral displacement of the rim 3 and the tire on the wheel. The rim 3 is expansible and contractible, and is contracted by the clamping rings 8 and made to engage the permanent rim 2 firmly so that it cannot be displaced by any accident, and the rings 8 are contracted by suitable means, such as a clamp shown in Figs. 12 and 13, in which a member 10 is provided with transverse studs 11 externally screw-threaded at 12 in opposite directions to engage a screw-threaded plug 13 and form a worm-gear. On the outer end of each stud 11 is an eccentric lug 14 over which is a flange 15 and the lug engages openings 16 in the enlarged ends 17 of the clamping ring 8, as shown in Fig. 1. As the plug 13 is revolved by a wrench engaging its head 17', the studs 11 are simultaneously revolved and the ends of the clamping ring drawn together, thus contracting the rim 3 and securing it on the permanent rim 2 of the wheel. The tire 18 and the casing 19 are carried on the rim 3 inflated, so that the rim and the tire as a whole may be readily applied to a wheel to displace a punctured or otherwise disabled tire with the minimum of labor and inconvenience to the user of a vehicle.

In Fig. 2, a rim 20 is shown, which is a type of rim at present in common use, and the supplemental or demountable rim 3 shows a modification which enables it to be used on the rim 20. The rim 20 is provided with an upward and inward bent member 21 on one edge to engage the member 4, and on the opposite edge is a member 21' and a groove 22 to receive the clamping ring 23 for securing the rim 3 on the rim 2. The ring 23 may be secured to the rim 20 by means of screw-bolts 24 and thus contract the rim 3 on the rim 2. In this construction the members 4 of the rim 3 are bent outward to accommodate a Dunlop tire.

In Fig. 3, filling pieces 25 of rubber are shown to engage the outer surfaces of a Dunlop tire, and by removing the filling pieces or gaskets of rubber a clencher tire can be used, thus making the rim 3 so that it can be used for either Dunlop or clencher tires.

In Fig. 4, the supplemental rim 26 is shown made of sheet metal with side members 27 bent to form a groove 28 for the clamping rings 8 to engage, and separate pieces 29 of sheet metal are interposed to engage the tire casing. In this construction it will not be necessary to make the transverse cuts 9 through the pieces 29, but only through the supplemental rim 26, as when the rim 26 is contracted, pieces 29 will by reason of the friction between them and the tire remain relatively with the tire.

In Fig. 5 the rim 3, is made of sheet metal and provided with the members 4 to engage a clencher tire, and the member 6, is bent upon itself to form a groove 7 to receive the upper inward bent flange of the clamping ring.

The supplemental rim shown in Figs. 8 and 9 is composed of transverse separate sections 30 of sheet metal, secured to a strip of metal 31, leaving spaces 32 between the sections which serve the same purpose as the transverse incisions 9 in the former construction. This rim is also bent to form members 4 to engage a tire and is provided with members 6 and grooves 7 on each edge to receive and support the clamping rings 8.

In Fig. 14 lugs 33 are shown on the adjacent ends of the clamping ring 8 and provided with a screw-bolt 34 for drawing the ends of the ring together to secure the supplemental rims upon the permanent rim.

In Figs. 10 and 11 a flat strap of metal 35 is shown for securing the adjacent ends of the rim 2 together, by means of screws 36 engaging slots 37 in the strap.

The demountable supplemental rim 3 is made of an internal diameter only slightly in excess of the external diameter of the rim 2, so that the former will pass over the latter readily and can then be quickly contracted and secured thereon.

The transverse incisions 9 render the rim flexible throughout the circumference thereof and admit of lateral flexure in the act of applying it, with the inflated tire thereon, to the permanent rim of a vehicle wheel.

It is obvious that changes may be made in details of construction without departing from the spirit of my invention.

Having thus fully described my invention, what I claim is

1. An annular circumferentially and laterally flexible demountable metallic rim, provided with means for engaging a tire, a tire supported on the rim, and a separate clamping-ring for securing the demountable rim to the permanent rim of a wheel.

2. A continuous demountable tire-supporting-rim, provided with means for engaging a tire, means to admit of circumferential expansion and contraction at the edges thereof and lateral flexure of the rim, and separate detachable clamping-rings for securing said rim to the permanent rim of a wheel.

3. An annular demountable tire-supporting-rim, provided with upturned members for engaging a tire, means distributed throughout the circumference of the rim to admit of expansion and contraction at the edges thereof and lateral flexure of the rim, and a separate clamping-ring for securing said rim to the permanent rim of a wheel.

4. An annular demountable tire-supporting-rim, provided with means for engaging a tire, transverse incisions extending from both edges thereof to provide for expansion, contraction and lateral flexure of the rim, and separate clamping-rings adapted to engage the edges of a permanent rim of a wheel and prevent lateral displacement thereon.

5. An annular demountable tire-supporting-rim, provided with means for engaging a tire, transverse incisions extending from both edges thereof to admit of expansion, contraction and lateral flexure of the rim, an annular seat on the rim, and a separate clamping-ring engaging said seat.

6. An annular demountable tire-supporting-rim having on one side thereof members for engaging a tire, and a cylindrical opposite side to engage a cylindrical permanent rim of a wheel, transverse incisions to provide for circumferential expansion and contraction and lateral flexure of the rim, and a separate clamping-ring for securing the demountable rim to the permanent rim.

In testimony whereof I affix my signature, in presence of two witnesses.

THOMAS MIDGLEY.

Witnesses:
NORA SCHIMPF,
ALEX. W. KRUMM.